(12) United States Patent
Iwano et al.

(10) Patent No.: US 11,484,057 B2
(45) Date of Patent: Nov. 1, 2022

(54) SYSTEM FOR FEEDING GRANULATED SUBSTANCE AND FEEDING METHOD USED THEREIN

(71) Applicant: JAPAN TOBACCO INC., Tokyo (JP)

(72) Inventors: Toru Iwano, Tokyo (JP); Katsuyuki Tsuboi, Tokyo (JP); Kazuyoshi Ono, Tokyo (JP); Tatsuya Iwao, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 0 days.

(21) Appl. No.: 17/131,243

(22) Filed: Dec. 22, 2020

(65) Prior Publication Data

US 2021/0106045 A1 Apr. 15, 2021

Related U.S. Application Data

(63) Continuation of application No. PCT/JP2019/035540, filed on Sep. 10, 2019.

(30) Foreign Application Priority Data

Sep. 12, 2018 (JP) .............................. JP2018-170663

(51) Int. Cl.
*A24C 5/39* (2006.01)
*B07B 4/02* (2006.01)
(Continued)

(52) U.S. Cl.
CPC .............. *A24C 5/396* (2013.01); *A24C 5/392* (2013.01); *A24C 5/397* (2013.01); *B07B 4/02* (2013.01);
(Continued)

(58) Field of Classification Search
CPC ........... A24C 5/396; A24C 5/397; B07B 4/02; B07B 9/02; B07B 11/04; B07B 11/06
See application file for complete search history.

(56) References Cited

U.S. PATENT DOCUMENTS 3,951,347 A * 4/1976 Tiggesbaumker .... B02C 15/007
241/119
4,010,096 A * 3/1977 Murray ..................... B07B 4/02
209/139.1
(Continued)

FOREIGN PATENT DOCUMENTS

CN     1406528 A    4/2003
CN   207544315 U    6/2018
(Continued)

OTHER PUBLICATIONS

International Search Report (PCT/ISA/210) issued in PCT/JP2019/035540, dated Nov. 26, 2019.
(Continued)

*Primary Examiner* — Michael McCullough
*Assistant Examiner* — Jessica L Burkman
(74) *Attorney, Agent, or Firm* — Birch, Stewart, Kolasch & Birch, LLP

(57) ABSTRACT

This system is for implementing a method for feeding of a granulated substance, and is provided with: a feeding path through which cut tobacco is fed toward a tobacco band in a cigarette manufacturing machine; a separation device for separating, by winnowing, the cut tobacco into good products and sub-standard products that are heavier than the good products, in the process of feeding the cut tobacco; an adjustment device that is capable of directly and/or indirectly adjusting the velocity of a current of air used for separation through winnowing; a transfer path which receives and transfers the sub-standard products discharged from the separation device; a weighing device which takes a sample of the sub-standard products being transferred on the transfer path and measures the weight of the sampled sub-standard products and outputs the weighing result; and a controller which, on the basis of the weighing result, controls the operation of the adjustment device so as to bring (Continued)

the sampling weight equal to a target value being the management standard.

11 Claims, 10 Drawing Sheets

(51) Int. Cl.
    *B07B 9/02*     (2006.01)
    *B07B 11/04*     (2006.01)
    *B07B 11/06*     (2006.01)

(52) U.S. Cl.
    CPC ............... *B07B 9/02* (2013.01); *B07B 11/04* (2013.01); *B07B 11/06* (2013.01)

(56) References Cited

U.S. PATENT DOCUMENTS

| | | | | |
|---|---|---|---|---|
| 5,184,730 A * | 2/1993 | Paul | ............... | B07B 11/04 406/28 |
| 5,541,831 A * | 7/1996 | Thomas | ............... | B03B 4/02 209/489 |
| 5,645,086 A | 7/1997 | Brand et al. | | |
| 6,290,071 B1 * | 9/2001 | Fisher | ............... | B07B 11/04 209/714 |
| 7,584,758 B2 * | 9/2009 | Focke | ............... | A24C 5/396 131/109.2 |
| 2003/0034040 A1 | 2/2003 | Barkmann et al. | | |
| 2018/0345322 A1 * | 12/2018 | Skinner | ............... | B07B 1/524 |

FOREIGN PATENT DOCUMENTS

| | | |
|---|---|---|
| DE | 195 08 139 A1 | 9/1996 |
| JP | 2000-60522 A | 2/2000 |
| PL | 59343 Y1 | 9/2002 |
| PL | 65892 Y1 | 4/2012 |

OTHER PUBLICATIONS

Chinese Office Action and Search Report for Chinese Application No. 201980057417.2, dated Jan. 25, 2022, with an English translation.

* cited by examiner

CONTROLLER

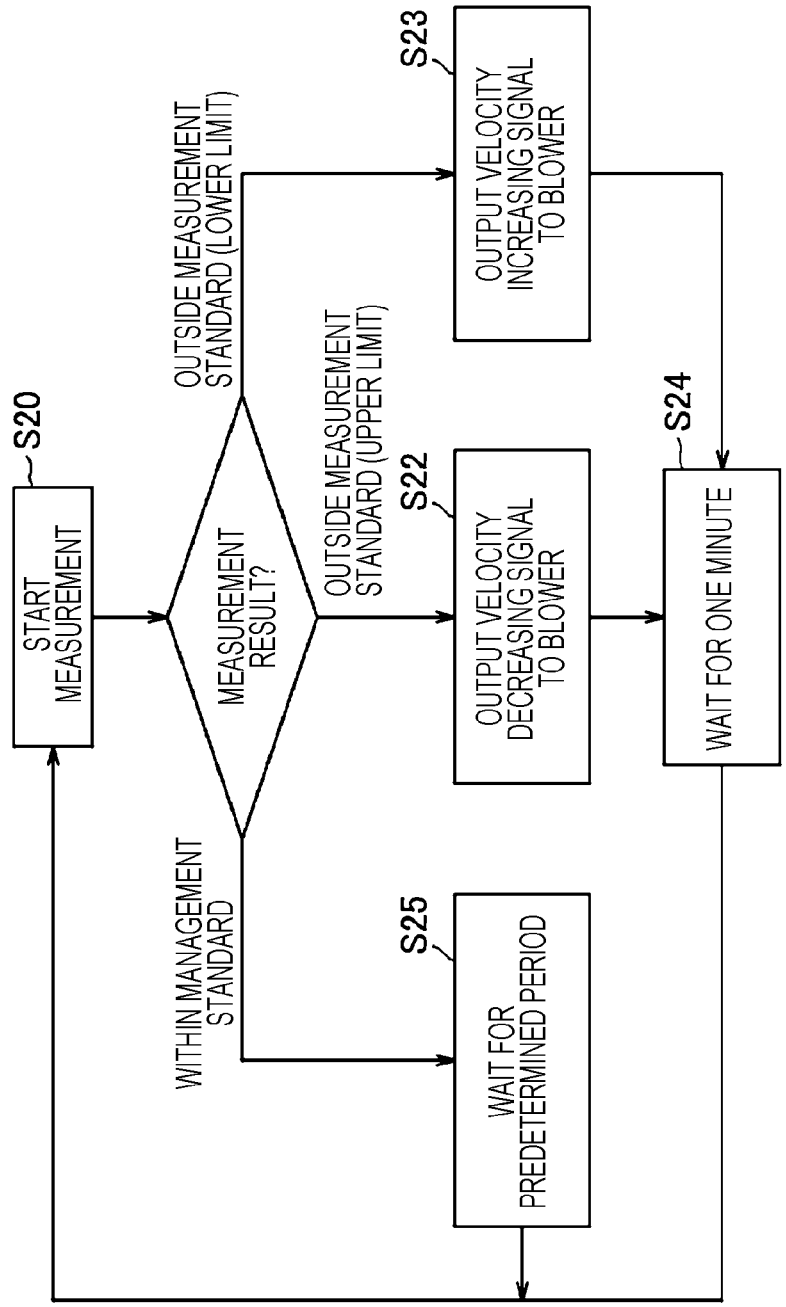

SYSTEM FOR FEEDING GRANULATED SUBSTANCE AND FEEDING METHOD USED THEREIN

CROSS REFERENCE TO RELATED APPLICATIONS

This application is a Continuation of PCT International Application No. PCT/JP2019/035540, filed on Sep. 10, 2019, which claims priority under 35 U.S.C. 119(a) to Patent Application No. 2018-170663, filed in Japan on Sep. 12, 2018, all of which are hereby expressly incorporated by reference into the present application.

TECHNICAL FIELD

It relates to a feeding system of a granulated substance and a feeding method thereof, and particularly relates to a feeding system and a feeding method to perform sorting of a granulated substance in a feeding process of a granulated substance.

BACKGROUND ART

A feeding system and a feeding method of this type, for example, feed shredded tobacco as a granulated substance together with a carrying airflow toward a tobacco band of a cigarette manufacturing machine. PTL 1 mentioned below discloses an example of such a system and a method. The feeding system in PTL 1 separates through winnowing shredded tobacco in a feeding process of shredded tobacco.

Specifically, first and second separation chutes are used for the separation through winnowing in this case. First and second airflows as sorting airflows are respectively generated in these first and second separation chutes. When the shredded tobacco passes through the inside of the first and second separation chutes, the shredded tobacco is sorted by the first and second airflows in accordance with the weight thereof.

Specifically, the shredded tobacco is sorted into shredded tobacco (a good product) lighter than or equal to an allowable value, and shredded tobacco (a sub-standard product) heavier than the allowable value. Only the good product is fed to the tobacco band. In contrast, the sub-standard product is discharged to a transfer path outside the feeding system, and the sub-standard product is not fed to the tobacco band.

CITATION LIST

Patent Literature

PTL 1: Japanese Unexamined Patent Application Publication No. 2000-60522

SUMMARY OF INVENTION

Technical Problem

The amount of sub-standard product discharged from the second separation chute, or so-called a winnowed amount is adjusted to a target value in consideration with the yield of shredded tobacco and the quality of cigarettes having a relation of tradeoffs in manufacturing of cigarettes. However, the target value of the winnowed amount is different depending on the brand of cigarettes to be manufactured, and hence there has been desired development of a feeding system and a feeding method capable of easily dealing with a change in the target value and quickly controlling the winnowed amount to the target value thereof.

Thus, an object of the invention of the present application is to provide a feeding system and a feeding method of a granulated substance, the system and method being capable of quickly and automatically controlling the winnowed amount of a granulated substance to a target value.

Solution to Problem

The above-described object is attained by a feeding system of a granulated substance according to the present invention, the feeding system including:

a feeding path configured to feed, toward a use machine that uses a granulated substance, the granulated substance together with a carrying airflow;

a separation device configured to, in a feeding process of the granulated substance, separate the granulated substance into a good product and a sub-standard product heavier than the good product by separation through winnowing, and discharge only the sub-standard product from the feeding path;

an adjustment device capable of directly and/or indirectly adjusting a flow velocity of a sorting airflow to be used for the separation through winnowing;

a transfer path configured to receive and transfer a sub-standard product discharged from the feeding path;

a weighing device configured to sample the sub-standard product transferred through the transfer path at a predetermined timing and for a predetermined period, perform weighing of a sampling weight of the sub-standard product and output of a weighing result of the weighing, and then return the sampled sub-standard product to the transfer path; and a controller configured to receive the weighing result from the weighing device, and, based on the weighing result, control an operation of the adjustment device to bring the sampling weight equal to a target value of a management standard.

Moreover, the present invention also provides a feeding method of a granulated substance, the feeding method including:

a feeding step of feeding, toward a use machine that uses a granulated substance, the granulated substance together with a carrying airflow along a feeding path;

a separation step of, in a feeding process of the granulated substance, separating a good product and a sub-standard product heavier than the good product by separation through winnowing, and discharging only the sub-standard product from the feeding path;

a transfer step of receiving and transferring a sub-standard product discharged from the feeding path;

a weighing step of sampling the sub-standard product transferred through the transfer path at a predetermined timing and for a predetermined period, performing weighing of a sampling weight of the sub-standard product and output of a weighing result of the weighing, and then returning the sampled sub-standard product to the transfer path; and a control step of receiving the weighing result from the weighing step, and, based on the weighing result, directly and/or indirectly controlling a flow velocity of a sorting airflow to be used for the separation through winnowing to bring the sampling weight equal to a target value of a management standard.

The above-described feeding system and feeding method focus on that there is a correlation between the flow velocity of the sorting airflow to be used for the separation through winnowing and the sampling weight of the sub-standard product, and automatically control the flow velocity of the sorting airflow to bring the sampling weight equal to the target value of the management standard.

Advantageous Effects of Invention

With the above-described feeding system (feeding method) according to the present invention, merely adjusting the flow velocity of the sorting airflow can quickly and automatically bring the discharge amount (the winnowed amount) of the sub-standard product equal to the target value of the management standard. Other advantageous effects of the feeding system (the feeding method) according to the present invention will be apparent from the description of embodiments which will be described later with reference to the attached drawings.

BRIEF DESCRIPTION OF DRAWINGS

FIG. 12 is a flowchart illustrating a control routine to be performed by a controller in FIG. 11.

DESCRIPTION OF EMBODIMENTS

Figure 1:
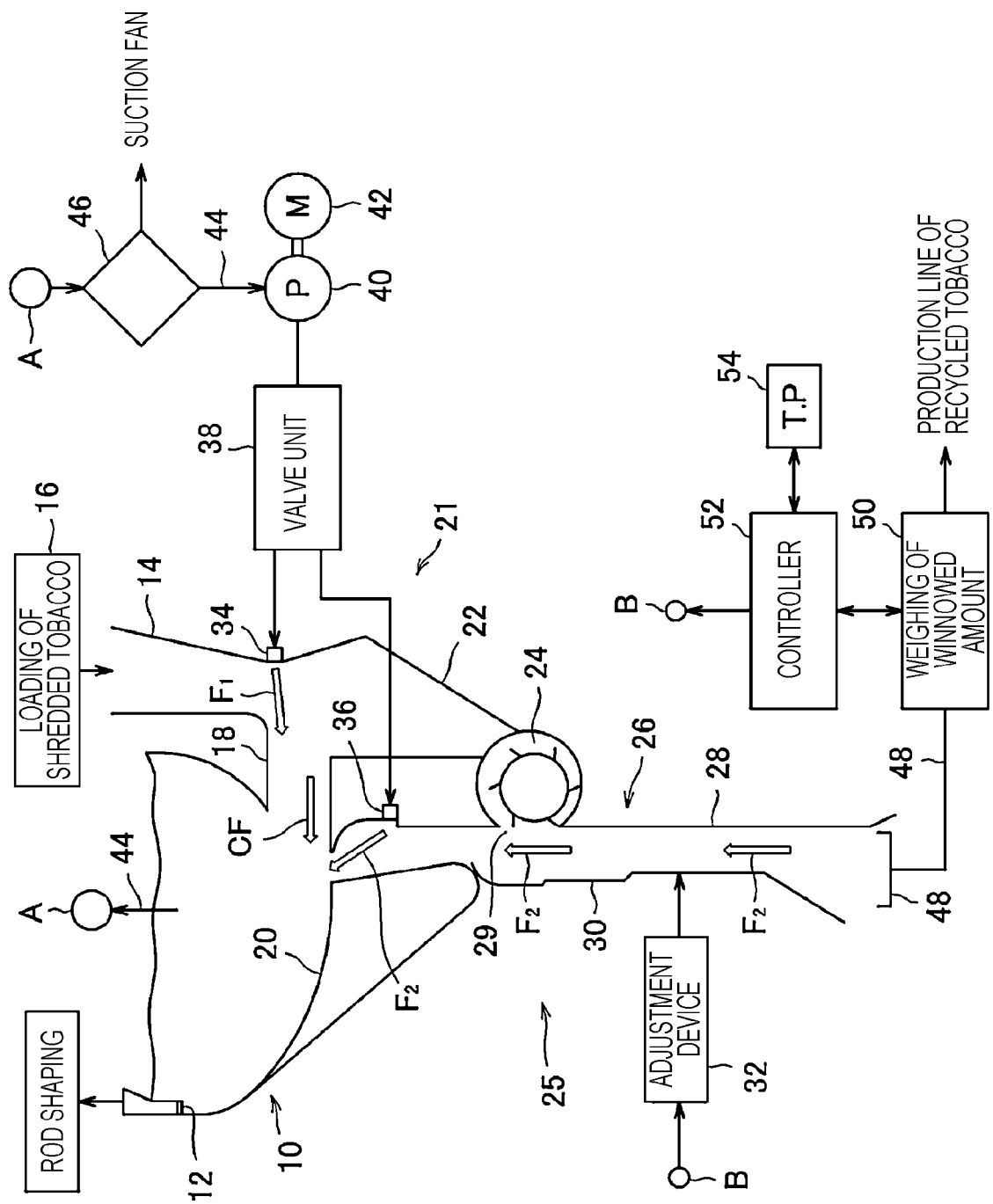
FIG. 1 is a schematic view illustrating a feeding system of shredded tobacco according to a first embodiment of the present invention applied to a cigarette manufacturing machine.

Referring to FIG. 1, a shredded-tobacco feeding system of a cigarette manufacturing machine according to a first embodiment of the present invention includes a feeding path 10 of shredded tobacco as a granulated substance. The feeding path 10 feeds the shredded tobacco together with a carrying airflow toward a tobacco band 12 of the cigarette manufacturing machine. The tobacco band 12 sucks the fed shredded tobacco in a layer form by suction to form a shredded-tobacco layer on a lower surface thereof. Then, the shredded-tobacco layer is transferred from the tobacco band 12 to a rod shaping section of the cigarette manufacturing machine. The shredded-tobacco layer is wrapped with wrapping paper and is formed into a tobacco rod in the rod shaping section. Furthermore, the tobacco rod is cut per predetermined length and is formed into a cigarette rod having a length equal to the length of a cigarette or a length twice the length of the cigarette.

An upstream section of the feeding path 10 is formed as a gravity chute 14. The gravity chute 14 extends in a vertical direction. An upper end of the gravity chute 14 is connected to a loading device 16 of shredded tobacco. The loading device 16 loads the shredded tobacco in the gravity chute 14 by a predetermined amount per unit time. Thus, the loaded shredded tobacco falls in the gravity chute 14 due to the self-weight. A lower end of the gravity chute 14 is connected to a flowing trough 20 via a connecting duct 18. The flowing trough 20 extends to the above-described tobacco band 12. The flowing trough 20 forms a downstream section of the feeding path 10 together with the connecting duct 18.

The shredded tobacco that has reached the lower end of the gravity chute 14 is separated through winnowing by a first separation device 21. The first separation device 21 includes a first separation chute 22. The first separation chute 22 extends downward from a connection region between the lower end of the gravity chute 14 and the connecting duct 18. A rotatable air locker 24 is positioned in the first separation chute 22 at the lower end of the first separation chute 22.

The lower end of the first separation chute 22 is connected to a second separation chute 26 of a second separation device 25 via the air locker 24. The second separation chute 26 also extends in the vertical direction. The second separation chute 26 has a downstream section, that is, an upper end open at the bottom of the flowing trough 20 near a terminal of the connecting duct 18 and a lower end exposed to the outside air.

Specifically, the second separation chute 26 includes two walls 28 and 30 facing each other. These walls 28 and 30 each extend from the upper end to the lower end of the second separation chute 26. The one wall 28 has an intermediate port 29 between the upper end and the lower end of the second separation chute 26. The above-described air locker 24 is disposed to be exposed from the intermediate port 29. In contrast, the other wall 30 extends from a level position corresponding to the air locker 24 to the lower end of the second separation chute 26. At least one of the walls 28 and 30 is movable so that the distance between the pair of walls 28 and 30, that is, the opening degree of the second separation chute 26 is variable via an adjustment device 32. The details of the adjustment device 32 will be described later.

Furthermore, a first air nozzle 34 is positioned at a lower end portion of the gravity chute 14, and a second air nozzle 36 is positioned at an upper portion of the fixed wall 28 of the second separation chute 26. These first and second air nozzles 34 and 36 are connected to an air pump 40 via a valve unit 38. The air pump 40 is driven by an electric motor 42 having an inverter. The air ejected from the air pump 40 is supplied to each of the first and second air nozzles 34 and 36 via the valve unit 38. The first air nozzle 34 generates a first airflow that flows across a lower end of the gravity chute 14 and then flows toward the flowing trough 20 via the connecting duct 18 as indicated by arrow F1 in FIG. 1.

In contrast, the second air nozzle 36 blows air toward the upper end of the second separation chute 26. In this case, since the lower end of the second separation chute 26 is exposed to the outside air as described above, the air is blown from the second air nozzle 36, the second separation chute 26 sucks the outside air from the lower end thereof, and the sucked outside air generates a second airflow (sorting airflow) in the second separation chute 26 as indicated by arrow F2 in FIG. 1.

Furthermore, although not illustrated in FIG. 1, a plurality of auxiliary air nozzles are disposed downstream of the upper end of the second separation chute 26 at the bottom of the flowing trough 20. These auxiliary air nozzles are also connected to the air pump 40 via the valve unit 38. Thus, auxiliary air is blown also from each of the auxiliary air nozzles.

The blowing of the above-described plurality of auxiliary airflows in addition to the first and second airflows F1 and F2 form the carrying airflow CF mentioned above for the shredded tobacco described above. The flow rate of the carrying airflow CF is adjustable by the valve unit 38. Specifically, the valve unit 38 can individually adjust the flow rates of the first and second airflows F1 and F2, and the flow rate of the plurality of auxiliary airflows.

Furthermore, the inside of the flowing trough 20 is connected to the air pump 40 via a return path 44. The return path 44 forms an air circulation path together with the feeding path 10 described above. Moreover, a cyclone dust collector 46 is disposed in the return path 44. The dust collector 46 is connected to a suction fan.

With the above-described feeding system, the shredded tobacco loaded from the above-described loading device 16 to the gravity chute 14 falls in the gravity chute 14 toward the lower end of the gravity chute 14. The shredded tobacco that has reached the lower end of the gravity chute 14 is separated through winnowing by the above-described first airflow F1, and sorted into relatively light shredded tobacco (first shredded tobacco) and relatively heavy shredded tobacco (second shredded tobacco). The first shredded tobacco is sent to the flowing trough 20 through the connecting duct 18, and then is fed toward the tobacco band 12 together with the carrying airflow CF.

In contrast, the second shredded tobacco passes across the first airflow F1, falls in the first separation chute 22, and then is loaded into the second separation chute 26 via the air locker 24. Then, the second shredded tobacco loaded into the second separation chute 26 is further separated through winnowing to be separated into relatively light shredded tobacco (third shredded tobacco) and relatively heavy shredded tobacco (fourth shredded tobacco). The third shredded tobacco is raised by the second airflow F2, is guided from the upper end of the second separation chute 26 to the flowing trough 20, and is fed toward the tobacco band 12 together with the above-described first shredded tobacco. Accordingly, the first and third shredded tobacco are used for manufacturing cigarettes as regular shredded tobacco.

In contrast, the fourth shredded tobacco falls as substandard shredded tobacco in the second separation chute 26 against the second airflow F2, and is discharged as a sub-standard product from the lower end of the second separation chute 26.

As illustrated in FIG. 1, a transfer path 48 is disposed directly below the second separation chute 26. The above-mentioned transfer path 48 receives the sub-standard shredded tobacco discharged from the lower end of the second separation chute 26 and transfers the sub-standard shredded tobacco toward, for example, a production line of recycled tobacco. The weighing device 50 that weighs the discharge amount of the sub-standard shredded tobacco, or so-called the winnowed amount is disposed in the transfer path 48. This weighing device 50 supplies the weighing result of the winnowed amount to a controller 52. The controller 52 is electrically connected to the above-described adjustment device 32, causes the adjustment device 32 to operate based on the weighing result of the winnowed amount, and controls the winnowed amount to a target value. Moreover, a touch panel (T.P) 54 as an input device is electrically connected to the controller 52. The touch panel 54 can be used for displaying an output from the controller 52 and for inputting a command to the controller 52. The details of the weighing device 50 and the controller 52 will be described later.

Adjustment Device

Figure 2:
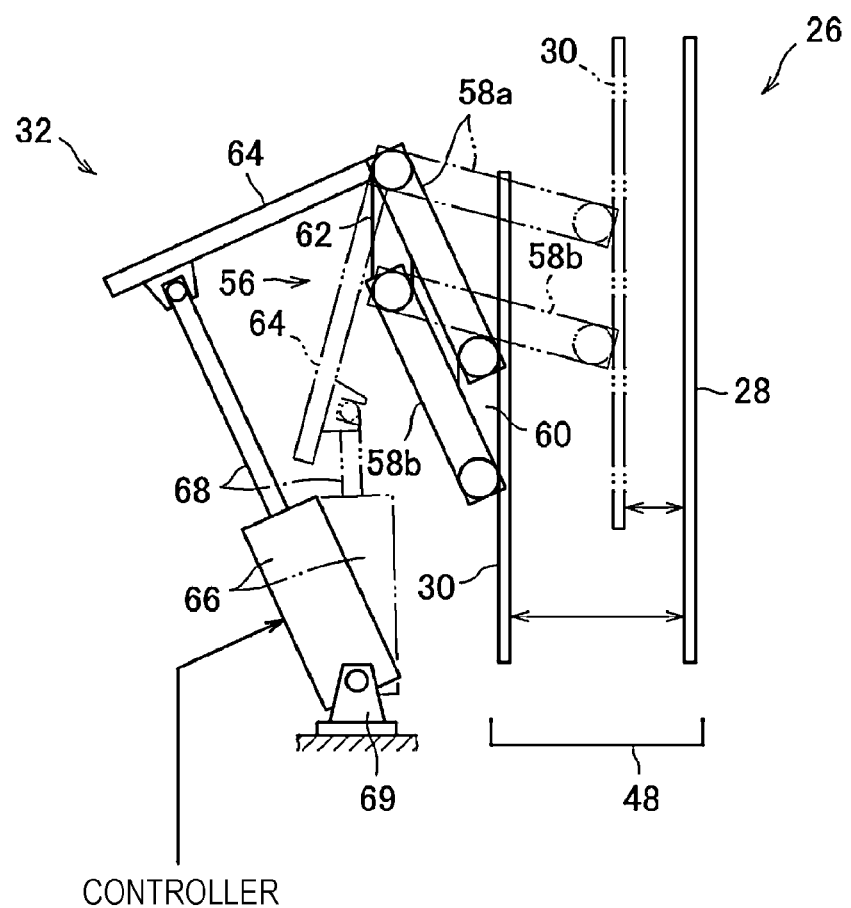
FIG. 2 is a diagram more specifically illustrating an adjustment device in FIG. 1.

FIG. 2 specifically illustrates an example of the above-described adjustment device 32.

The adjustment device 32 includes a parallel link 56. The parallel link 56 has a pair of link arms 58a and 58b parallel to each other. One ends of these link arms 58a and 58b are coupled to the other wall, that is, the movable wall 30, of the second separation chute 26 via a bracket 60. In contrast, the other ends of the pair of link arms 58a and 58b are coupled to each other via an intermediate link arm 62. Furthermore, a driving arm 64 extends from the other end of the link arm 58a. The driving arm 64 is coupled to a driving rod 68 of an electric cylinder 66. The electric cylinder 66 is rotatably supported by an attachment base 69.

When the driving rod 68 of the electric cylinder 66 is contracted from a state indicated by solid lines in FIG. 2, the movable wall 30 is moved toward the one wall, that is, the fixed wall 28, of the second separation chute 26. Consequently, a distance D between the fixed wall 28 and the movable wall 30 decreases from D1 to D2. In contrast, when the driving rod 68 of the electric cylinder 66 is expanded from a state indicated by two-dot chain lines in FIG. 2, the movable wall 30 is moved in a direction away from the fixed wall 28, and the distance D increases to D1.

The above-mentioned distance D represents the degree with which the lower end of the second separation chute 26 is open with respect to the outside air, that is, the opening degree (the smallest flow-path cross section) of the second separation chute 26. Thus, the above-described adjustment device 32 can adjust the opening degree of the second separation chute 26. In the case of the present embodiment, to allow the opening degree of the second separation chute 26 to be automatically adjustable, the electric cylinder 66 is electrically connected to the above-described controller 52, and the controller 52 can control the operation of the electric cylinder 66.

Further additionally, the above-described adjustment device 32 moves the movable wall 30 in a direction toward or in a direction away from the fixed wall 28. However, the adjustment device 32 may move the two walls 28 and 30 simultaneously in a direction toward each other or in a direction away from each other to decrease or increase the above-mentioned distance D.

Weighing Device

Figure 3:
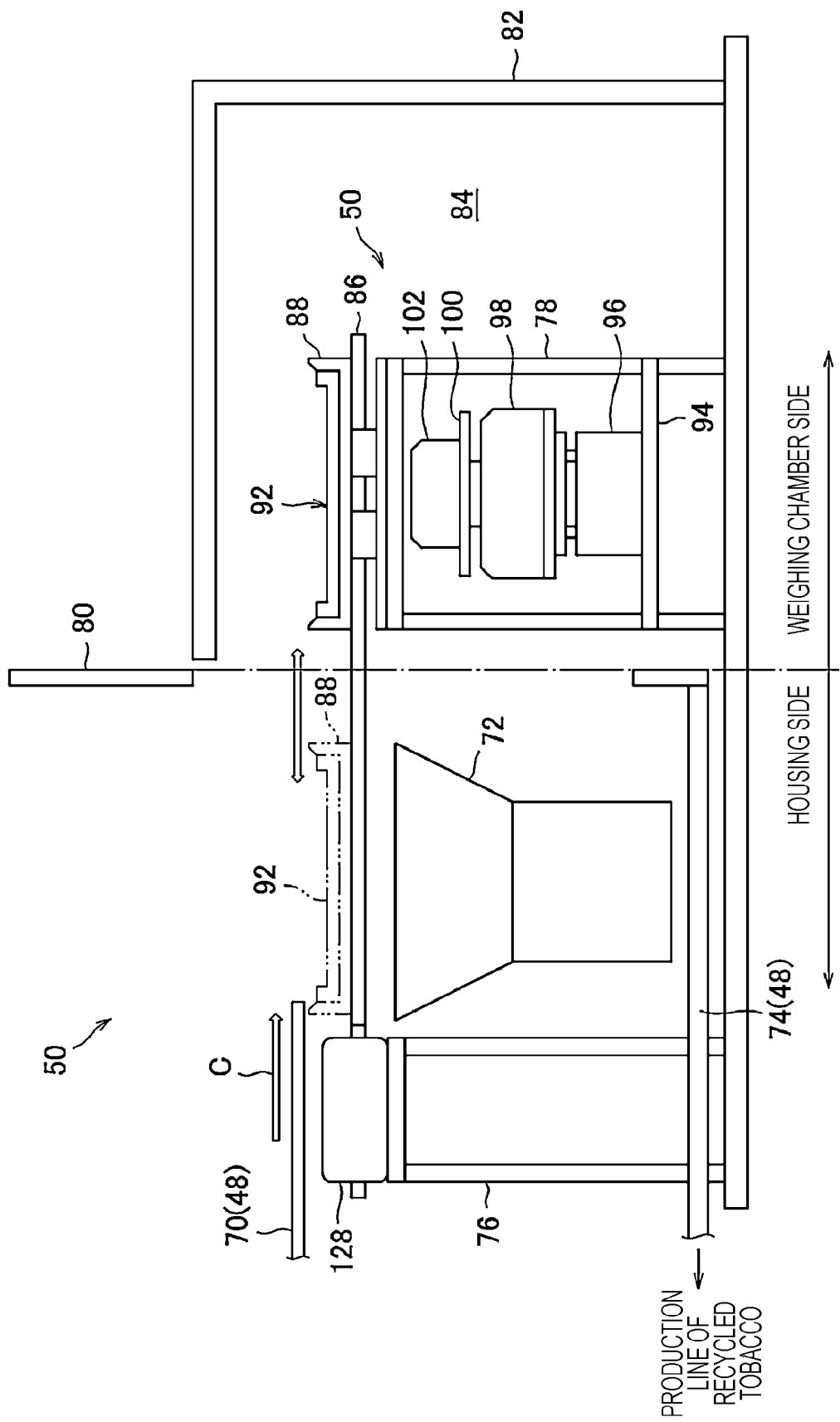
FIG. 3 is a diagram illustrating an example of a weighing device in FIG. 1.

FIG. 3 specifically illustrates an example of the above-described weighing device 50. First, before the weighing device 50 is described, the above-described transfer path 48 is additionally described. In the present embodiment, the transfer path 48 includes a first vibration conveyor 70. The first vibration conveyor 70 extends from directly below the lower end of the second separation chute 26, and transfers the sub-standard shredded tobacco in a direction of arrow C in FIG. 3. A hopper-shaped relay duct 72 is disposed in direct front of a terminal of the first vibration conveyor 70. The relay duct 72 is positioned at a level lower than that of the first vibration conveyor 70. Furthermore, a second vibration conveyor 74 is disposed directly below the relay duct 72. The second vibration conveyor 74 extends from the relay duct 72 in a direction opposite to the first vibration conveyor 70.

Thus, when the sub-standard shredded tobacco is transferred on the first vibration conveyor 70, the sub-standard shredded tobacco is received by the second vibration conveyor 74 via the inside of the relay duct 72 from the terminal of the first vibration conveyor 70, and then is further transferred toward the above-described production line of recycled tobacco by the second vibration conveyor 74.

The weighing device 50 includes a first support frame 76 and a second support frame 78. The first support frame 76 is disposed below a terminal portion of the first vibration conveyor 70. In contrast, the second support frame 78 is disposed apart from the first support frame 76 in a transfer direction of the sub-standard shredded tobacco on the first vibration conveyor 70. Specifically, the second support frame 78 is disposed outside a housing 80 of the above-described feeding system, and is covered with a cover 82. The cover 82 is adjacent to the above-mentioned housing 80, and the inside of the cover 82 defines a weighing chamber 84. The weighing chamber 84 communicates with the inside of the feeding system via an opening formed in the housing 80.

A pair of horizontal linear guides 86 extends from the first support frame 76 to the second support frame 78 to be parallel to each other. Both end portions of these linear guides 86 are supported by upper surfaces of the first and second support frames 76 and 78. A tray shuttle 88 is attached to the linear guides 86. The tray shuttle 88 reciprocatory movable along the linear guides 86 using a linear actuator (not illustrated) such as an air cylinder.

A tray unit 92 for sampling the sub-standard shredded tobacco is disposed on the tray shuttle 88 via a plurality of electromagnets (not illustrated). Thus, when these electromagnets are energized, the tray unit 92 is attracted to the tray shuttle 88, and hence is fixed to the tray shuttle 88. Thus, when the tray shuttle 88 is positioned together with the tray unit 92 at a position directly above the relay duct 72, that is, a sampling position, as indicated by two-dot chain lines in FIG. 3 from a position directly above the second support frame 78, the sub-standard shredded tobacco discharged from the terminal of the first vibration conveyor 70 is not received by of the second vibration conveyor 74 but is received by the tray unit 92 to be sampled.

In contrast, the second support frame 78 includes a shelf plate 94 in a lower portion thereof. An electronic scale 98 is disposed on the shelf plate 94 via an air cylinder 96 with a guide. The electronic scale 98 has a horizontal scale plate 100 and a pair of pushers 102. These pushers 102 protrude upward from the scale plate 100. Specifically, in a state illustrated in FIG. 4, the pair of pushers 102 is positioned below the pair of linear guides 86 and between these linear guides 86.

Figure 4:
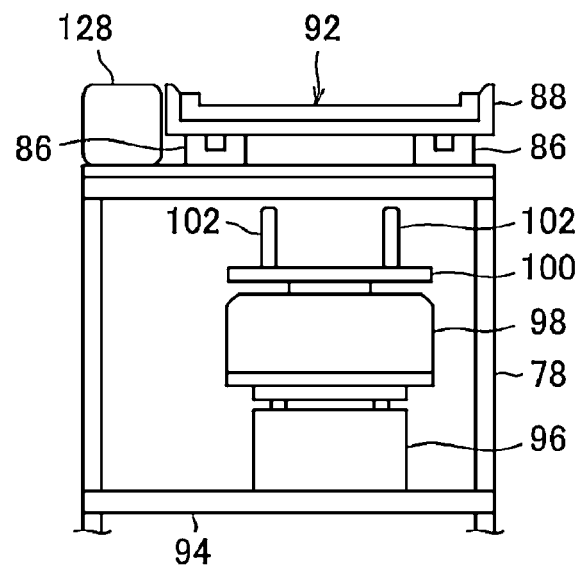
FIG. 4 is a diagram illustrating a state in which an electronic scale of the weighing device in FIG. 3 is at a non-operating position.
Figure 5:
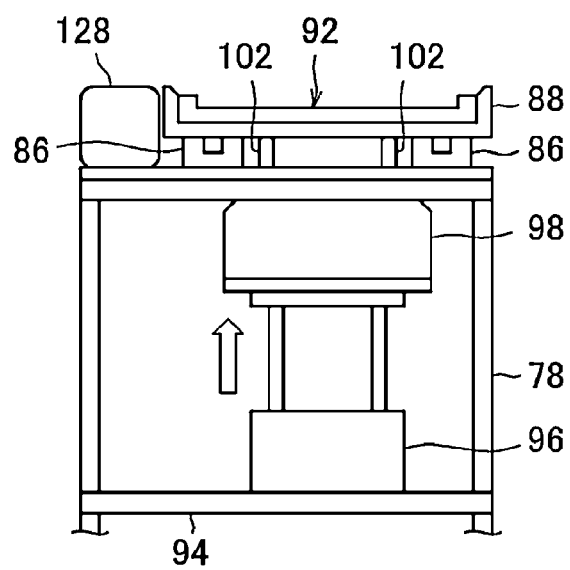
FIG. 5 is a diagram illustrating a state in which the electronic scale in FIG. 4 is at a weighing position.

After the sampling of the sub-standard shredded tobacco to the tray unit 92 is ended, the tray unit 92 returns to the position directly above the second support frame 78, that is, the weighing position together with the tray shuttle 88 (the state in FIG. 4). Then, when the above-described electromagnets are deenergized and the air cylinder 96 is expanded, the electronic scale 98 rises as illustrated in FIG. 5. At this time, the pair of pushers 102 of the electronic scale 98 protrudes above the second support frame 78 and further passes through the tray shuttle 88 to lift the tray unit 92 from the tray shuttle 88.

Thus, at this time point, the electronic scale 98 can weigh the weight of the tray unit 92 with the sub-standard shredded tobacco sampled, that is, the sampling weight (the winnowed amount) of the sub-standard shredded tobacco. The electronic scale 98 outputs the weighing result of the weighing to the above-described controller 52. Then, the electronic scale 98 and the tray unit 92 return to the non-operating position illustrated in FIG. 4. The tray unit 92 is attracted again to the tray shuttle 88 by the electromagnets, and is fixed again to the tray shuttle 88.

In contrast, with the above-described sampling method, after the winnowed amount is weighed, the sub-standard shredded tobacco in the tray unit 92 is required to be returned to the above-described transfer path 48. Thus, the tray unit 92 according to the present embodiment has a specific structure. The structure is described in detail below with reference to FIGS. 6 and 7.

Figure 6:
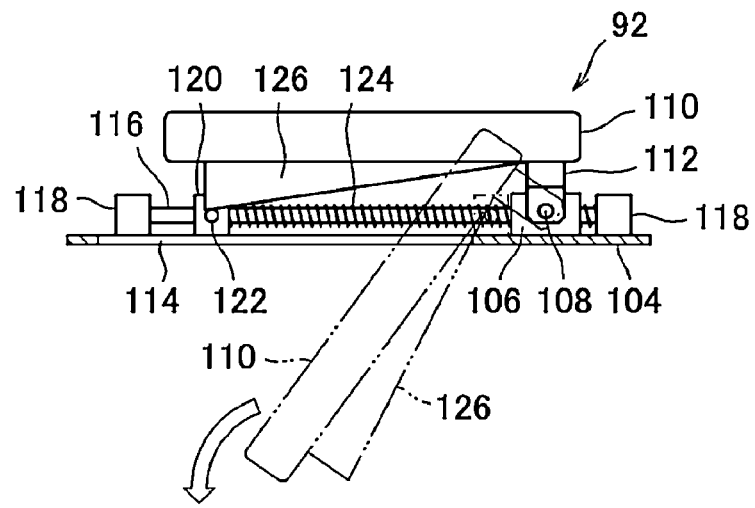
FIG. 6 is a schematic side view illustrating the details of a tray unit in FIG. 3.
Figure 7:
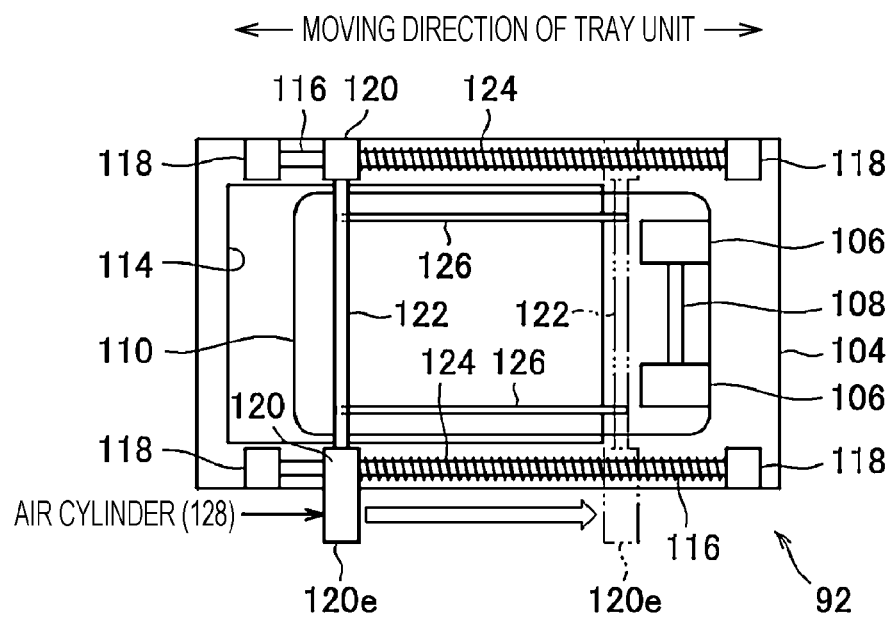
FIG. 7 is a schematic plan view illustrating the details of the tray unit in FIG. 3.

As illustrated in FIG. 6, the tray unit 92 includes a plate-shaped tray base 104. The tray base 104 is attractable to the tray shuttle 88 via the above-mentioned electromagnets. The tray base 104 has a pair of brackets 106 on one end portion thereof. These brackets 106 are apart from each other in a direction orthogonal to a moving direction of the tray unit 92 as illustrated in FIG. 7, and support respective both end portions of a rod 108.

A tray 110 for actually receiving the sub-standard shredded tobacco is disposed directly above the tray base 104. One end portion of the tray 110 is rotatably supported by the rod 108 via a pair of links 112. When the tray 110 is rotated downward about the rod 108 as the center, the tray 110 is inclined downward so that the other end portion thereof passes through an opening 114 formed in the tray base 104.

Furthermore, guide rods 116 are disposed on respective both sides of the opening 114 of the tray base 104. Both ends of these guide rods 116 are supported by the tray base 104 via brackets 118. A slider 120 is attached to each of the guide rods 116. These sliders 120 are coupled to each other via a coupling rod 122. Moreover, as apparent from FIG. 7, a compression coil spring 124 is disposed on each of the guide rods 116 to surround the guide rod 116. These compression coil springs 124 extend from the corresponding sliders 120 to the brackets 118 positioned on one end side of the tray base 104. Thus, when each of the compression coil springs 124 is in a decompressed state, as illustrated in FIGS. 6 and 7, the compression coil springs 124 move the coupling rod 122 toward the other end side of the tray base 104 via the corresponding sliders 120.

In contrast, a pair of triangular plates 126 protrudes downward from a lower surface of the tray 110. These triangular plates 126 have right triangular forms and extend in the moving direction of the tray unit 92 to be parallel to each other. More specifically, a lower edge of each of the triangular plates 126 is defined by the hypotenuse of the above-mentioned right triangle. The hypotenuse gradually rises from the other end side toward the one end side of the tray 110 as apparent from FIG. 6.

When the tray 110 is in a state indicated by solid lines in FIGS. 6 and 7, the pair of triangular plates 126 is in contact with the coupling rod 122 at portions of the hypotenuses located on the other end side of the tray 110. Consequently, the tray 110 is held in a horizontal posture. Note that FIG. 7 illustrates only the contour of the tray 110.

When the coupling rod 122 is moved together with the pair of sliders 120 from such a state against urging forces of the compression coil springs 124 toward the one end side of the tray 110, contact positions of the coupling rod 122 with the hypotenuses of the triangular plates 126 are also changed toward the one end side of the tray 110. Thus, the tray 110 is rotated downward about the rod 108 as the center due to the self-weight as described above. That is, the tray 110 is rotated downward in accordance with the inclination of the hypotenuses of the triangular plates 126. Accordingly, the sub-standard shredded tobacco in the tray 110 can be discharged from the tray 110 (see two-dot chain lines in FIG. 6).

To allow the above-described coupling rod 122 to be movable, one of the sliders 120 has an extension portion 120e (see FIG. 7). Moreover, the weighing device 50 further includes an air cylinder 128. The air cylinder 128 is disposed on an upper surface of the first support frame 76 as illustrated in FIG. 3. When the tray unit 92 is positioned at the above-described sampling position, a piston rod of the air cylinder 128 is expanded toward the tray unit 92 and comes into contact with the extension portion 120e of the slider 120 to move the coupling rod 122 toward the one end side of the tray 110 via the extension portion 120e. Thus, the downward rotation operation of the tray 110 can be performed only when the tray unit 92 is at the sampling position. The sub-standard shredded tobacco discharged from the tray 110 is received on the second vibration conveyor 74 via the relay duct 72.

After the discharge of the sub-standard shredded tobacco from the tray 110 is ended, the tray unit 92 returns from the sampling position to the weighing position. At this time, the extension portion 120e of the slider 120 is separated from the piston rod of the air cylinder 128, and the coupling rod 122 returns toward the other end side of the tray 110 by the urging forces of the compression coil springs 124, to recover the tray 110 to the horizontal posture. Thus, since the recovery of the tray 110 to the horizontal posture is performed in the process in which the tray unit 92 returns to the weighing position, at this time, even though the sub-standard shredded tobacco falls on the tray 110 from the terminal of the first vibration conveyor 70, the sub-standard shredded tobacco here is received by the second vibration conveyor 74 via the relay duct 72 from the tray 110.

Consequently, after the discharge of the sub-standard shredded tobacco from the tray 110 is completed, the sub-standard shredded tobacco does not remain in the tray 110 of the tray unit 92 that has returned to the weighing position, thereby not causing a trouble in the next sampling of the sub-standard shredded tobacco. Note that the piston rod of the air cylinder 128 is contracted in the process in which the tray unit 92 returns from the sampling position to the weighing position.

All the operations of the actuator, air cylinder, electronic scale, and so forth, of the above-described weighing device 50 are controlled by the above-described controller 52. Consequently, a series of routines from the sampling of the sub-standard shredded tobacco from the transfer path 48 via the weighing of the sub-standard shredded tobacco sampled by the sampling of the sub-standard shredded tobacco to the return of the sampled sub-standard shredded tobacco to the transfer path 48 is automated.

Figure 8:
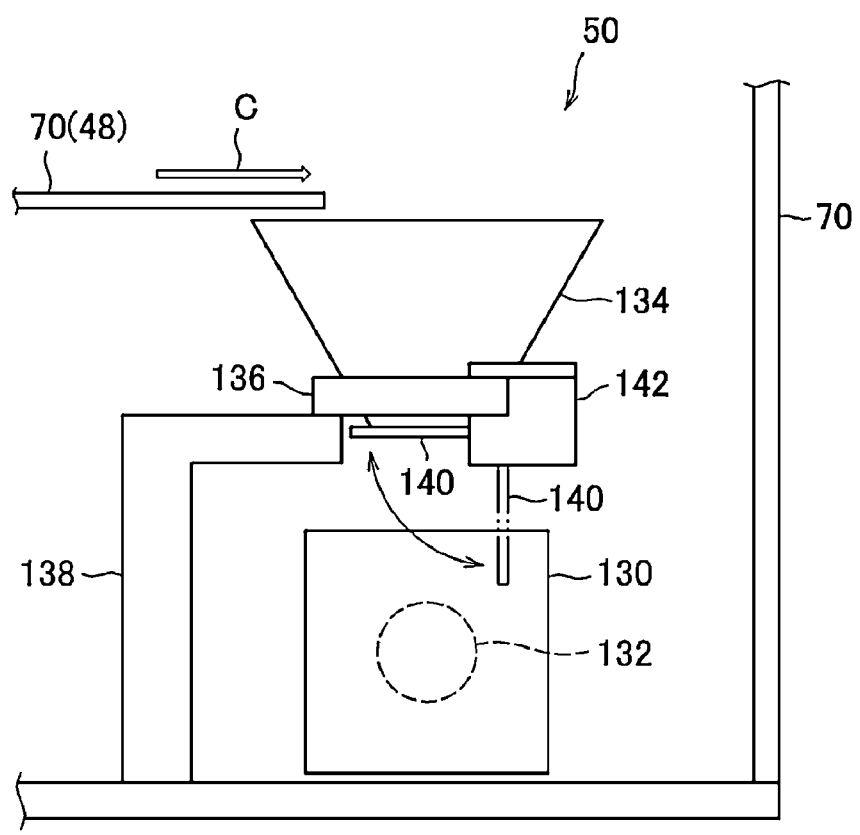
FIG. 8 is a schematic view illustrating a portion of a weighing device according to a modification.

FIG. 8 illustrates another example of the weighing device 50. Also in this case, the transfer path 48 is described before the description of the weighing device 50.

The transfer path 48 includes a recovery box 130 instead of the second vibration conveyor 74. The recovery box 130 is disposed below the terminal of the first vibration conveyor 70, and has an upper end that is open upward. A recovery hose 132 extends from the recovery box 130. The recovery hose 132 is connected to the production line of recycled tobacco. Furthermore, a suction fan (not illustrated) is connected to the recovery hose 132. The suction fan can generate an airflow in the recovery hose 132 from the recovery box 130 toward the production line of recycled tobacco.

The weighing device 50 here includes a weighing hopper 134 disposed between the terminal of the first vibration conveyor 70 and the recovery box 130. The weighing hopper 134 has an openable and closable discharge port at a lower end thereof. Thus, when the discharge port is closed, the weighing hopper 134 can receive the sub-standard shredded tobacco discharged from the terminal of the first vibration conveyor 70.

Also, the weighing hopper 134 is attached to a support frame 138 via a pair of load cells 136 as a scale. These load cells 136 are supported by the support frame 138 in a cantilevered manner. Thus, the pair of load cells 136 can measure the weight of the weighing hopper 134, that is, the weight (the winnowed amount) of the sub-standard shredded tobacco sampled in the weighing hopper 134.

The discharge port of the weighing hopper 134 is opened and closed by a plate-shaped shutter 140. The shutter 140 is attached to the discharge port via a hinge shaft. The hinge shaft is supported via a pair of bearings near the discharge port, and is also coupled to a rotary air cylinder 142. The rotary air cylinder 142 is supported by the support frame 138 via a bracket (not illustrated). The rotary air cylinder 142 rotates the shutter 140 around the hinge shaft to open and close the discharge port of the weighing hopper 134.

The sampling of the sub-standard shredded tobacco is performed in a state in which the discharge port of the weighing hopper 134 is closed. During the sampling, the pair of load cells 136 measures the sampling weight (the winnowed amount) of the sub-standard shredded tobacco, and continuously outputs the weighing result to the controller 52.

Then, when the sampling of the sub-standard shredded tobacco is ended, the controller 52 obtains the winnowed amount based on an output signal from the load cells 136 at the time point of the end of the sampling and also opens the discharge port of the weighing hopper 134 via the rotary air cylinder 142. Accordingly, after the sampling, the sub-standard shredded tobacco is sent out toward the production line of recycled tobacco from the weighing hopper 134 via the recovery box 130 and the recovery hose 132.

Additionally, when the sampling of the sub-standard shredded tobacco is not requested, the discharge port of the weighing hopper 134 is maintained in the open state, and hence the sub-standard shredded tobacco discharged from the terminal of the first vibration conveyor 70 is sent to the production line of recycled tobacco via the weighing hopper 134, the recovery box 130, and the recovery hose 132.

Also in the case of the above-described weighing device in FIG. 8, the operation of the rotary air cylinder 142 is controlled by the controller 52. Consequently, a series of routines from the sampling of the sub-standard shredded tobacco to the measurement of the winnowed amount is automated likewise.

Figure 9:
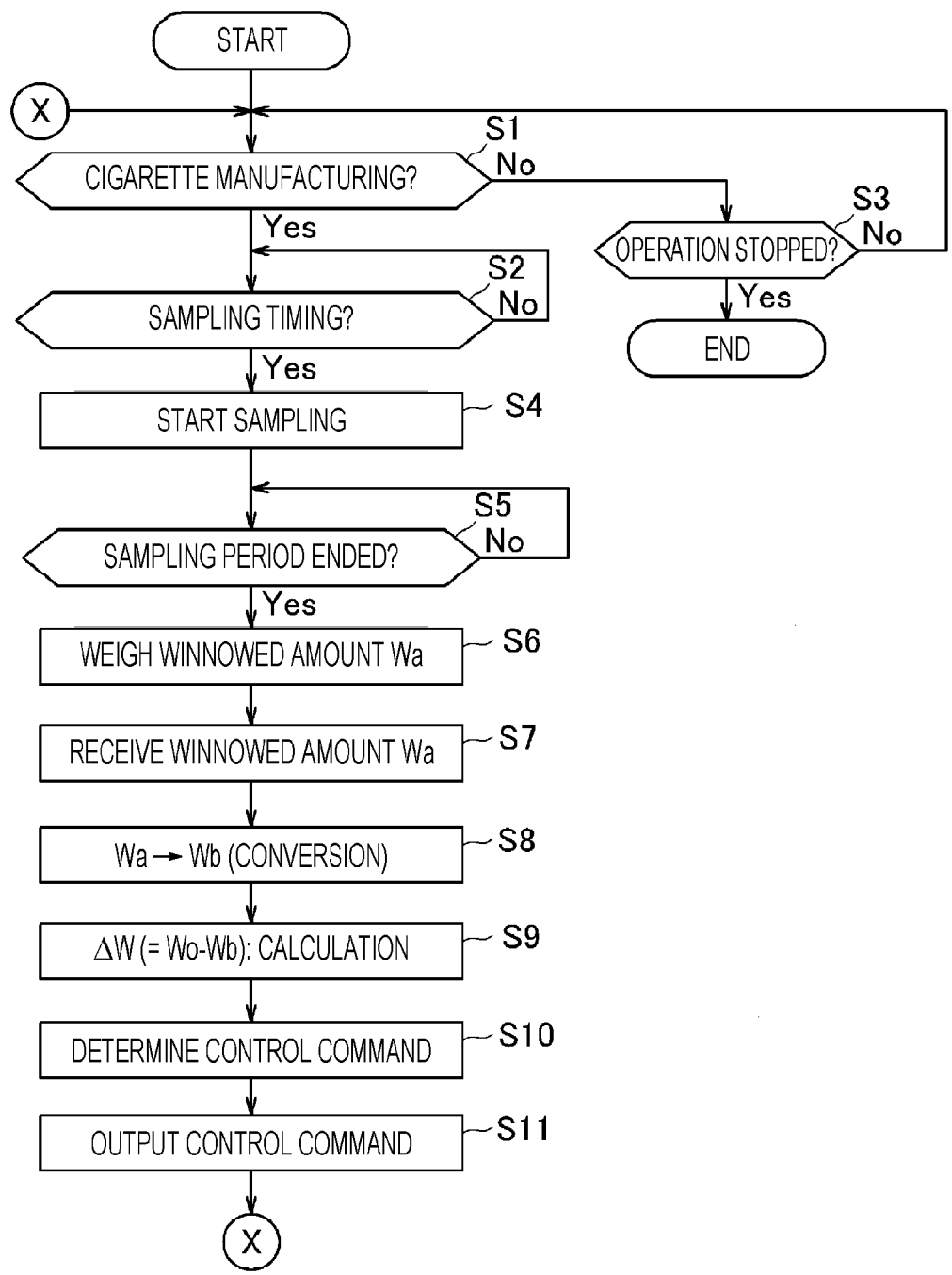
FIG. 9 is a flowchart illustrating a control routine to be performed by a controller in FIG. 1.
Figure 10:
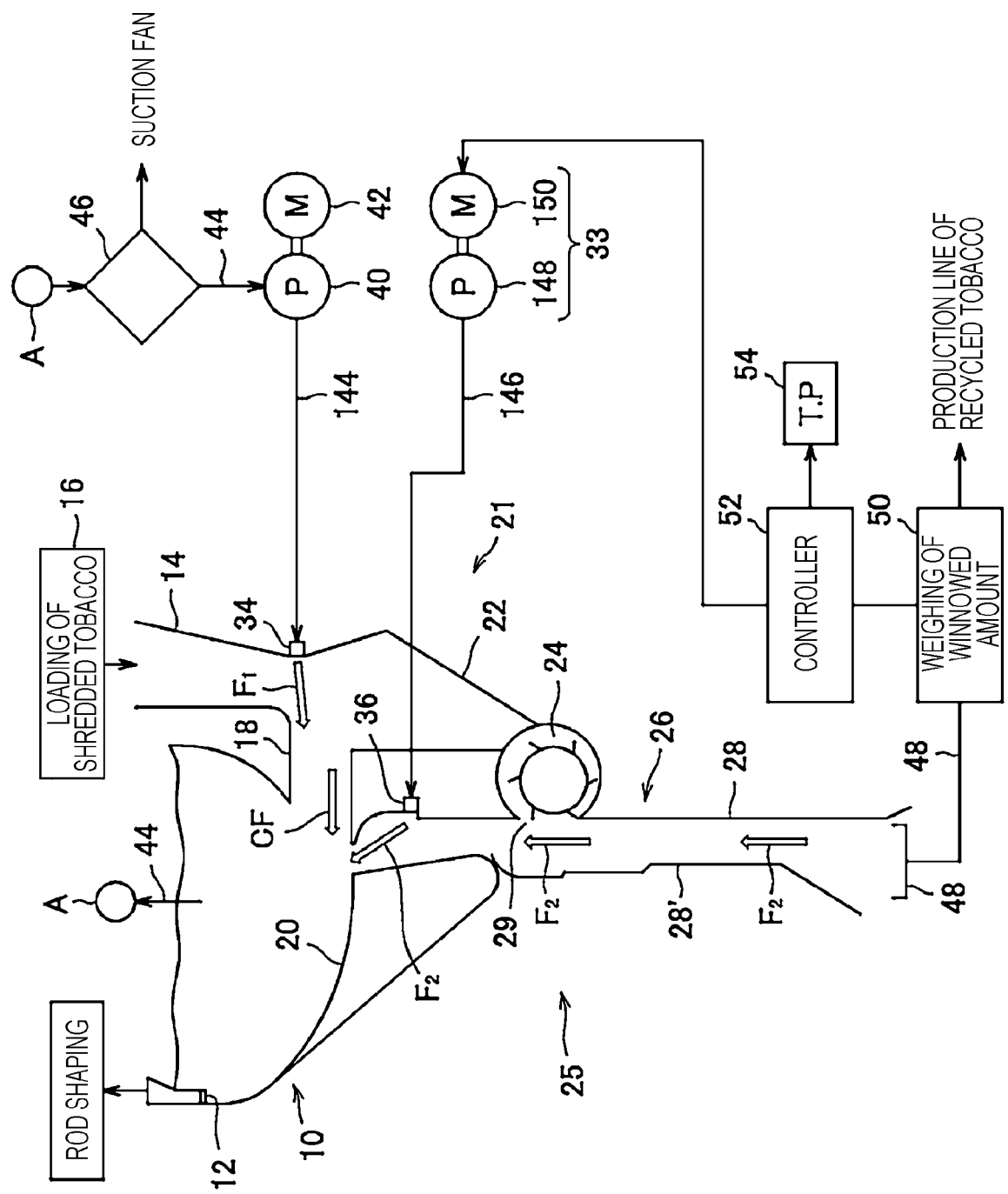
FIG. 10 is a schematic view of a feeding system according to a second embodiment of the present invention.

FIGS. 9 and 10 illustrate a control flow to be executed by the controller 52. The control flow includes sampling of the sub-standard shredded tobacco, measurement of the winnowed amount, and operational control on the above-described adjustment device 32 based on the measurement result.

In the control flow, it is first determined whether the cigarette manufacturing machine is in operation or not (step S1). When the determination result here is true (Yes), it is determined whether the timing is a sampling timing of the sub-standard shredded tobacco or not (step S2). When the determination result in step S1 is false (No), it is determined whether the operation of the cigarette manufacturing machine has been stopped or not (step S3). When the determination result here is true, the controller 52 stops the operation. However, when the determination result in step S3 is false, the determination in step S2 via step S1 is repeatedly performed.

The sampling timing in step S2 is, for example, selected from a predetermined time point of a work day, a time point of a shift of a worker, every hour of a work day, or the like, and is stored in advance in a memory of the controller 52 using the above-described touch panel 54.

When the determination result of step S2 is true, the controller 52 starts the sampling of the sub-standard shredded tobacco using one of the above-described weighing devices 50 (step S4). Next, it is determined whether a sampling period has been ended or not (step S5). The sampling period in step S5 is, for example, set as a predetermined period, and is stored in advance in the memory of the controller 52 using the touch panel 54.

When the determination result of step S5 is true, the controller 52 causes the weighing device 50 to measure the sampling weight, that is, an winnowed amount Wa of the sub-standard shredded tobacco (step S6), and receives the measured winnowed amount Wa from the weighing device 50 (step S7). Then, the controller 52 converts the winnowed amount Wa into a winnowed amount Wb of a management standard (step S8). In this case, the winnowed amount Wb of the management standard represents, for example, a winnowed amount when 10 million cigarettes are manufactured by the cigarette manufacturing machine. In this case, the winnowed amount Wb of the management standard has a target value Wo for each of sets of a plurality of kinds of tobacco leaves with which shredded tobacco is manufactured for each brand of cigarettes to be manufactured, that is, for cigarettes of a certain brand. The target value Wo is determined by an upper limit value and a lower limit value. Such a target value Wo of the management standard is stored in a manner rewritable through an input to the controller 52 using the touch panel 54.

Next, the controller 52 calculates a deviation ΔW(=Wo−Wb) between the winnowed amount Wb and the target value Wo (step S9), determines a control command on the above-described adjustment device 32 based on whether the deviation ΔW is positive or negative and the absolute value of the deviation ΔW (step S10), and outputs the control command to a driver that drives the electric cylinder 66 of the adjustment device 32 (step S11). Then, the controller 52 repeatedly performs the above-described control routine.

Specifically, when the deviation ΔW in step S10 is positive, the control command is determined to operate the electric cylinder 66 based on the magnitude of the deviation ΔW in a direction in which the opening degree (the distance D) of the above-described second separation chute 26 is increased, and in contrast when the deviation ΔW is negative, the control command is determined to operate the electric cylinder 66 based on the magnitude of the absolute value of the deviation ΔW in a direction in which the opening degree (the distance D) is decreased. When the deviation ΔW is within an allowable range, the control command becomes an invalid command, and the electric cylinder 66 maintains the current state.

As long as the electric cylinder 66 of the adjustment device 32 is operated based on the control command, the flow velocity of the second airflow in the second separation chute 26 is decreased or increased, and hence the winnowed amount Wb thereafter is quickly changed toward the target value Wo. Furthermore, since the above-described adjustment on the winnowed amount Wb is periodically repeated during operation of the cigarette manufacturing machine, the winnowed amount Wb is stably maintained at the target value Wo.

Further additionally describing, when the deviation ΔW in step S10 is positive, the electric cylinder 66 is operated stepwise in the direction in which the opening degree (the distance D) of the second separation chute 26 is increased. The operation stroke of the electric cylinder 66 at this time is determined in accordance with the magnitude of the deviation ΔW. In contrast, when the deviation ΔW is negative, the electric cylinder 66 is operated stepwise in the direction in which the opening degree (the distance D) of the second separation chute 26 is decreased. The operation stroke of the electric cylinder 66 at this time is determined in accordance with the magnitude of the absolute value of the deviation ΔW.

Specifically, the operation stroke per one-time operation of the electric cylinder 66 is determined based on a parameter input to the controller 52 using the touch panel 54. The parameter may be stored in the controller 52. For example, when the electric cylinder 66 has the maximum operation stroke of 100 mm, the operation stroke per one-time operation is determined in accordance with the deviation ΔW from a sequence of numbers, for example, 1.0 mm, 1.5 mm, 2.0 mm, . . . , as the parameter.

The inventors and the like have found that, during continuous operation of a cigarette manufacturing machine including a system that performs a feeding method of related art, as long as the brand of cigarettes being manufactured by the cigarette manufacturing machine is the same, the winnowed amount Wb does not markedly vary. Thus, when the deviation ΔW in step S10 is a positive or negative value, as long as the electric cylinder 66 is operated stepwise, that is, as long as the control routine in FIG. 9 is repeatedly performed, the deviation ΔW gradually converges toward the inside of the above-described management standard (between the upper limit value and the lower limit value) and falls within the management standard.

Furthermore, the inventors and the like have found that, when a plurality of cigarette manufacturing machines each including a system that performs a feeding method of related art is being operated, even though the brands of cigarettes to be manufactured are the same and the opening degrees (the distances D) of the second separation chutes 26 are the same, the winnowed amounts Wb discharged from the respective cigarette manufacturing machines are different. Thus, even though the deviations ΔW are the same, since the operation strokes per one-time operation of the electric cylinders 66 can be selected from the above-described sequence of numbers, the operation strokes suitable for the corresponding cigarette manufacturing machines can be determined.

The controller 52 can store the operation period of the cigarette manufacturing machine, the winnowed amount Wb, the deviation ΔW, the control command to the electric cylinder 66, the brand of cigarettes to be manufactured, and so forth, as operation records after the operation of the cigarette manufacturing machine is stopped. In other words, the controller 52 can store the last control command to the electric cylinder 66 for each brand of manufactured cigarettes. Thus, when the operation of the cigarette manufacturing machine is resumed, the controller 52 supplies the same control command to the electric cylinder 66 as the control command supplied to the electric cylinder 66 when the cigarettes of the same brand as the brand of cigarettes to be manufactured this time were manufactured last time, to return the opening degree (the distance D) of the second separation chute 26 to the same opening degree (the distance D) as that of the last time through the operation of the electric cylinder 66.

Furthermore, when deviation of the winnowed amount Wb from the target value Wo is repeated and the number of repetitions of the deviation has reached a predetermined value, the controller 52 may output a command that notifies the feeding system about occurrence of an abnormality instead of outputting the control command to the electric cylinder 66.

FIG. 10 illustrates a shredded-tobacco feeding system according to a second embodiment. In the case of the second embodiment, the second separation chute 26 includes a fixed wall 28' instead of the above-described movable wall 30, and the smallest flow-path cross section of the second separation chute 26 is constant. Thus, in the case of the second embodiment, the above-described adjustment device 32 is not required.

In the case of the second embodiment, the feeding system includes first and second air paths 144 and 146 that independently supply the air toward the first and second air nozzles 34 and 36. The first air path 144 directly connects the first air nozzle 34 to the above-described air pump 40. The second air path 146 directly connects the second air nozzle 36 to an air pump 148 that differs from the air pump 40. The air pump 148 is also connected to an electric motor 150 having an inverter. The electric motor 150 is electrically connected to the above-described controller 52. That is, the second air-path air pump 148 and the electric motor 150 constitute an adjustment device 33 that directly adjusts the flow rate of the second airflow, that is, the flow velocity thereof, instead of the above-described adjustment device 32.

With the adjustment device 33 according to such a second embodiment, the flow rate of the air ejected from the first air nozzle 34, that is, the first airflow F1, and the flow rate of the air ejected from the second air nozzle 36, that is, the second airflow F2 can be independently variable. Thus, the controller 52 can control the winnowed amount Wb to be equal to the target value Wo likewise by adjusting the rotation speed of the electric motor 150, that is, the flow velocity (the flow rate) of the second airflow F2 based on the above-described deviation ΔW.

Specifically, in the above-described control routine, step S10 determines the control command as follows. When the deviation W is positive, the control command is determined to increase the rotation speed of the electric motor 150 in the direction in which the flow rate (the flow velocity) of the second airflow F2 is increased based on the magnitude of the deviation ΔW. In contrast, when the deviation W is negative, the control command is determined to decrease the rotation speed of the electric motor 150 in the direction in which the flow rate (the flow velocity) of the second airflow F2 is decreased based on the magnitude of the absolute value of the deviation ΔW. When the deviation ΔW is within an allowable range, the control command becomes an invalid command, and the electric motor 150 maintains the current state.

Moreover, the feeding system according to the present invention may include both the adjustment device 32 illustrated in FIG. 2 and the adjustment device 33 illustrated in FIG. 10. In this case, the adjustment devices 32 and 33 can further quickly adjust the flow rate (the flow velocity) of the second airflow F2, that is, the winnowed amount Wb cooperatively.

Figure 11:
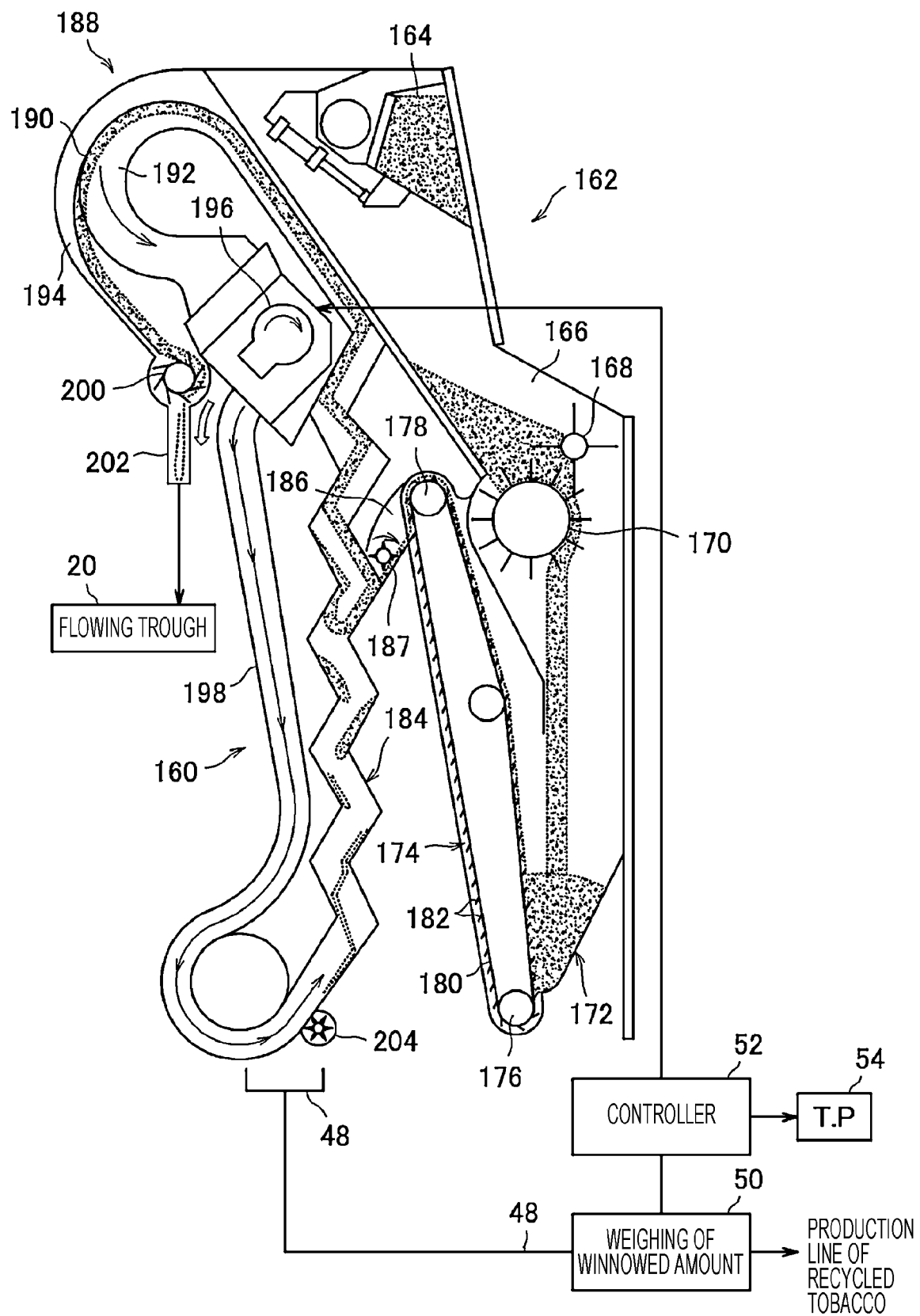
FIG. 11 is a schematic view of a feeding system according to a third embodiment of the present invention.

Furthermore, FIG. 11 illustrates a shredded-tobacco feeding system according to a third embodiment of the present invention.

The shredded-tobacco feeding system according to the third embodiment includes an air-circulating separation duct 160 instead of the first and second separation chutes 22 and 26 of the systems according to the above-described first and second embodiments. The separation duct 160 is disposed between a loading device 162 of shredded tobacco and the above-described flowing trough 20. The above-mentioned loading device 162 includes a charging gate 164 of shredded tobacco in an upper portion thereof. A loading chute 166 of shredded tobacco extends downward from the charging gate 164. The charging gate 164 is opened and closed with an air pressure, and loads supplied shredded tobacco into the loading chute 166.

Scraping rolls 168 and 170 having combs are disposed in the middle of the loading chute 166. These scraping rolls 168 and 170 temporarily stop the shredded tobacco loaded in the loading chute 166 cooperatively with each other, and in contrast cause the shredded tobacco to fall in accordance with the rotation thereof. The falling amount here is determined by the rotation speeds of the scraping rolls 168 and 170. Furthermore, a bottom portion of the loading chute 166 is formed as a storage 172 of shredded tobacco. The shredded tobacco falling in the loading chute 166 is finally stored in the storage 172.

A portion of the storage 172 is formed by a steep conveyor 174. The steep conveyor 174 extends upward from the storage 172 at a steep inclination angle. The steep conveyor 174 includes a lower roll 176, an upper roll 178, and a conveyor belt 180 that connects these rolls. The conveyor belt 180 has multiple scraping pins 182. Thus, when the steep conveyor 174 is driven, the steep conveyor 174 scrapes the shredded tobacco from the storage 172, and transfers the scraped shredded tobacco toward the upper roll 178.

In contrast, the above-described separation duct 160 includes a zigzag part 184. The zigzag part 184 is disposed adjacent to the steep conveyor 174, and extends along the steep conveyor 174. An upper end portion of the steep conveyor 174 is connected to an intermediate region of the zigzag part 184 via a supply pit 186. The supply pit 186 has an air locker 187 at a lower end thereof. Thus, the shredded tobacco that has reached an upper end of the steep conveyor 174 falls in the supply pit 186, and then is supplied to the zigzag part 184 from the supply pit 186 via the air locker 187.

The separation duct 160 further includes a Coanda separator 188. The Coanda separator 188 is connected to an upper end of the zigzag part 184. A downstream part of the Coanda separator 188 is separated by a separation edge 190 into an air flow path 192 and a tobacco flow path 194. The air flow path 192 is connected to an air flow path 198 via a blower 196. The air flow path 198 extends straight downward along the zigzag part 184 from the blower 196, then is curved in a U shape, and is connected to a lower end of the zigzag part 184. Furthermore, an air locker 204 is disposed at the lower end of the zigzag part 184. The zigzag part 184 can be connected to the outside via the air locker 204.

In contrast, the tobacco flow path 194 is connected to a deposition pit 202 via an air locker 200, and the deposition pit 202 extends straight downward. A lower end of the deposition pit 202 is connected to the above-described flowing trough 20 via a connection flow path. A scraping roll is disposed directly below the lower end of the deposition pit 202. In FIG. 11, the connection flow path and the scraping roll are omitted.

The above-described blower 196 generates a carrying airflow that circulates in the separation duct 160. When the carrying airflow passes through the zigzag part 184 of the separation duct 160, the flowing profile of the carrying airflow becomes non-uniform. The shredded tobacco is separated through winnowing into relatively light good shredded tobacco and relatively heavy sub-standard shredded tobacco in the zigzag part 184. That is, the carrying airflow here also serves as a sorting airflow.

Specifically, the good shredded tobacco rises together with the carrying airflow in the zigzag part 184, flows into the Coanda separator 188, is separated from the carrying airflow in the Coanda separator 188, and then is supplied into the deposition pit 202 via the tobacco flow path 194 and the air locker 200. In contrast, the carrying airflow after the good shredded tobacco is separated is returned to the blower 196 via the air flow path 192.

The shredded tobacco in the deposition pit 202 is removed from the deposition pit 202 by the rotation of the above-described scraping roll, is supplied to the tobacco band 12 via the flowing trough 20 as described above, and is used for manufacturing cigarettes. Additionally, the deposition level of the shredded tobacco in the deposition pit 202 is constantly maintained in an allowable range. To attain this, the supply amount of the shredded tobacco into the above-described separation duct 160, that is, the operating speed of the steep conveyor 174 is controlled. In contrast, the sub-standard shredded tobacco falls in the zigzag part 184 against the carrying airflow rising in the zigzag part 184, and reaches the air locker 204 of the zigzag part 184. Thus, the sub-standard shredded tobacco after the separation through winnowing in the zigzag part 184 can be discharged to the outside from the zigzag part 184 via the air locker 204.

Even with the feeding system according to the above-described third embodiment, similarly to the feeding system according to the second embodiment, the discharge amount, that is, the winnowed amount of the sub-standard shredded tobacco is changed in accordance with the flow rate (the flow velocity) of the carrying airflow circulating in the separation duct 160. Thus, as illustrated in FIG. 11, as long as the air locker 204 of the zigzag part 184 is connected to the weighing device 50 via the transfer path 48, and in contrast the blower 196, that is, a motor of the blower 196 is electrically connected to the controller 52, even with the feeding system according to the third embodiment, the winnowed amount can be automatically controlled to the target value similarly to the case of the second embodiment.

FIG. 12 schematically illustrates a portion of a control routine to be performed by the controller 52 of the feeding system according to the third embodiment. In the control routine, measurement of the winnowed amount Wb is started in step S20, and the measurement result of the winnowed amount Wb is determined in next step S21. When the winnowed amount Wb is so large that exceeds the upper limit value of the management standard as the result of the determination here, a velocity decreasing signal is output to the blower 196 in step S22. Thus, the blower 196 decreases the velocity of the carrying airflow flowing in the separation duct 160. In contrast, when the winnowed amount Wb is not below the lower limit value of the management standard, a velocity increasing signal is output to the blower 196 in step S23. Thus, the blower 196 increases the velocity of the carrying airflow flowing in the separation duct 160. Then, step S24 is performed after step S22 or step S23. In the step S24, the controller 52 waits for, for example, one minute. That is, the velocity of the carrying airflow is maintained in a decreased or increased state for one minute.

In contrast, when the winnowed amount Wb is determined as being within the management standard in step S21, the controller 52 waits for a predetermined period in step S25. That is, the carrying airflow flowing in the separation duct 160 is maintained at the velocity of the current time point for a predetermined period. Thus, as apparent from the above description, as long as the above-described control routine is repeatedly performed, the winnowed amount Wb is quickly converged toward the management standard, and then is stably maintained within the management standard.

Finally, the feeding system and the feeding method according to the present invention, and may be likewise applied to sorting and feeding of various kinds of granulated substances without being limited to the shredded tobacco that is used for manufacturing cigarettes.

REFERENCE SIGNS LIST

10 feeding path
12 tobacco band
14 gravity chute (upstream section)
20 flowing trough (downstream section)
21 first separation device (first separation step)
22 first separation chute
24 air locker
25 second separation device (second separation step)
26 second separation chute
28 fixed wall
30 movable wall
32, 33 adjustment device
34 first air nozzle
36 second air nozzle
48 transfer path
50 weighing device
52 controller
54 touch panel (input device)
148 air pump (adjustment device)
150 electric motor (adjustment device)
160 separation duct
184 zigzag part
188 Coanda separator
196 blower (adjustment device)

The invention claimed is:

1. A feeding system of a granulated substance, comprising:
a feeding path configured to feed, toward a use machine that uses a granulated substance, the granulated substance together with a carrying airflow;
a separation device configured to, in a feeding process of the granulated substance, separate the granulated substance into a good product and a sub-standard product heavier than the good product by separation through winnowing, and discharge only the sub-standard product from the feeding path;
an adjustment device capable of adjusting a flow velocity of a sorting airflow to be used for the separation through winnowing;
a transfer path configured to receive and transfer a sub-standard product discharged from the feeding path;
a weighing device configured to sample the sub-standard product transferred through the transfer path at a predetermined timing and for a predetermined period, perform weighing of a sampling weight of the sub-standard product and output of a weighing result of the weighing, and then return the sampled sub-standard product to the transfer path; and a controller configured to receive the weighing result from the weighing device, and, based on the weighing result, control an operation of the adjustment device to bring the sampling weight equal to a target value of a management standard, wherein the adjustment device is capable of adjusting the flow velocity of the sorting airflow by changing the opening degree of the feeding path.

2. The feeding system of a granulated substance according to claim 1, wherein the feeding path includes a gravity chute forming an upstream section of the feeding path and configured to cause the granulated substance to fall due to a self-weight, and a downstream section extending from a lower end of the gravity chute to the use machine, wherein the separation device comprises a first separator configured to separate through winnowing a granulated substance that has reached the lower end of the gravity chute into a first granulated substance as a good product and a second granulated substance heavier than the first granulated substance, cause the first granulated substance to move toward the downstream section, and in contrast cause the second granulated substance to fall from the lower end of the gravity chute into a first separation chute, and a second separator, the second separator having a second separation chute extending downward from the downstream section and configured to receive the second granulated substance from the first separation chute, and an air nozzle configured to generate a sorting airflow in the second separation chute, wherein the second separator separates through winnowing the second granulated substance into a third granulated substance as a good product to move toward the downstream section and a sub-standard product heavier than the third granulated substance using the sorting airflow in the second separation chute, and wherein the third granulated substance moves toward the downstream section together with the sorting airflow in the second separation chute, and in contrast the sub-standard product falls in the second separation chute against the sorting airflow.

3. The feeding system of a granulated substance according to claim 2, wherein the adjustment device is capable of adjusting smallest flow-path cross section of the second separation chute and a flow rate of air to be supplied to the air nozzle.

4. The feeding system of a granulated substance according to claim 1, wherein the controller is configured to convert the weighing result into a conversion value with regard to the management standard, and control an operation of the adjustment device based on a deviation between the conversion value and the target value.

5. The feeding system of a granulated substance according to claim 1, further comprising an input device configured to input each of the timing, the period, and the target value of the management standard to the weighing device and/or the controller.

6. A feeding method of a granulated substance, comprising:

a feeding step of feeding, toward a use machine that uses a granulated substance, the granulated substance together with a carrying airflow along a feeding path;

a separation step of, in a feeding process of the granulated substance, separating a good product and a sub-standard product heavier than the good product by separation through winnowing, and discharging only the sub-standard product from the feeding path;

a transfer step of receiving the sub-standard product discharged from the feeding path and transferring the sub-standard product along a transfer path;

a weighing step of sampling the sub-standard product transferred through the transfer path at a predetermined timing and for a predetermined period, performing weighing of a sampling weight of the sub-standard product and output of a weighing result of the weighing, and then returning the sampled sub-standard product to the transfer path; and a control step of receiving the weighing result from the weighing step, and, based on the weighing result, controlling a flow velocity of a sorting airflow to be used for the separation through winnowing to bring the sampling weight equal to a target value of a management standard, wherein the controlling of the flow velocity of the sorting airflow includes changing the opening degree of the feeding path.

7. The feeding method of a granulated substance according to claim 6, wherein the separation step separates through winnowing the granulated substance in a separation duct defining a circulation path of the carrying airflow that also serves as the sorting airflow, and wherein the control step is capable of directly adjusting a flow rate of the carrying airflow.

8. The feeding method of a granulated substance according to claim 6, wherein the feeding step includes a process of causing the granulated substance to fall due to a self-weight in a gravity chute forming an upstream section of the feeding path, wherein the separation step comprises a first separation process of separating through winnowing a granulated substance that has reached a lower end of the gravity chute into a first granulated substance as a good product and a second granulated substance heavier than the first granulated substance, causing the first granulated substance to move toward a downstream section of the feeding path, and in contrast causing the second granulated substance to fall from the lower end of the gravity chute into a first separation chute, and a second separation process of separating through winnowing the second granulated substance using a sorting airflow into a third granulated substance as a good product and a fourth granulated substance as a sub-standard product heavier than the third granulated substance in a second separation chute extending downward from the downstream section and configured to receive the second granulated substance from the first separation chute, the sorting airflow being generated by an air nozzle configured to blow air in the second separation chute in the second separation process, and wherein the third granulated substance moves toward the downstream section together with the sorting airflow, and in contrast the fourth granulated substance falls in the second separation chute against the sorting airflow.

9. The feeding method of a granulated substance according to claim 8, wherein the control step adjusts a smallest flow-path cross section of the second separation chute and a flow rate of air to be supplied to the air nozzle.

10. The feeding method of a granulated substance according to claim 6, wherein the control step converts the weighing result into a conversion value with regard to the management standard, and controls a flow velocity of the sorting airflow based on a deviation between the conversion value and the target value.

11. The feeding method of a granulated substance according to claim 6, further comprising a preparation step of setting each of the timing, the period, and the target value of the management standard.

\* \* \* \* \*